(12) United States Patent
Koneru et al.

(10) Patent No.: US 11,775,773 B2
(45) Date of Patent: Oct. 3, 2023

(54) METHODS FOR CONDUCTING A CONVERSATION IN AN APPLICATION ENABLED BY A VIRTUAL ASSISTANT SERVER AND DEVICES THEREOF

(71) Applicant: Kore.ai, Inc., Orlando, FL (US)

(72) Inventors: Rajkumar Koneru, Windermere, FL (US); Prasanna Kumar Arikala Gunalan, Hyderabad (IN)

(73) Assignee: KORE.AI, INC., Orlando, FL (US)

( * ) Notice: Subject to any disclaimer, the term of this patent is extended or adjusted under 35 U.S.C. 154(b) by 231 days.

(21) Appl. No.: 17/122,730

(22) Filed: Dec. 15, 2020

(65) Prior Publication Data

US 2022/0188523 A1 Jun. 16, 2022

(51) Int. Cl.
| | |
|---|---|
| *G06F 40/00* | (2020.01) |
| *G06F 40/35* | (2020.01) |
| *G06F 40/279* | (2020.01) |
| *G06F 3/14* | (2006.01) |

(52) U.S. Cl.
CPC ............ *G06F 40/35* (2020.01); *G06F 40/279* (2020.01); *G06F 3/14* (2013.01)

(58) Field of Classification Search
CPC .......... G06F 40/35; G06F 40/279; G06F 3/14; G10L 15/22
See application file for complete search history.

(56) References Cited

U.S. PATENT DOCUMENTS

| | | | |
|---|---|---|---|
| 7,917,840 B2 | 3/2011 | Newman et al. | |
| 9,318,108 B2* | 4/2016 | Gruber | G06F 9/54 |
| 9,342,908 B2* | 5/2016 | Hirsch | G06T 11/206 |
| 9,842,102 B2 | 12/2017 | Salome et al. | |
| 2011/0197124 A1* | 8/2011 | Garaventa | G06F 16/972 |
| | | | 715/234 |

(Continued)

FOREIGN PATENT DOCUMENTS

WO WO-2019068203 A1 * 4/2019 ....... G06F 16/90332

OTHER PUBLICATIONS

Google Developers, Jun. 15, 2014. "Build a Small Knowledge Graph Part 1 of 3: Creating and Processing Linked Data". [video] Available at: <https://www.youtube.com/watch?v=W9pRpSW_KqA&t=201s> [Accessed Nov. 29, 2021].

(Continued)

*Primary Examiner* — Douglas Godbold
*Assistant Examiner* — Parker Mayfield
(74) *Attorney, Agent, or Firm* — Troutman Pepper Hamilton Sanders LLP

(57) ABSTRACT

A virtual assistant server determines at least one user intent based on an analysis of a received conversational user input. One or more of a plurality of views is identified based on the at least one user intent. Further, the virtual assistant server retrieves content based on the at least one user intent or the identified one or more views. The virtual assistant server determines one of a plurality of graphical user interface layers to display for each of one or more parts of the content and the identified one or more views based at least on one or more factors related to the content. Subsequently, the virtual assistant server outputs instructions based on the determined one of the graphical user interface layers in response to the received conversational user input.

21 Claims, 10 Drawing Sheets

(56) References Cited

U.S. PATENT DOCUMENTS

| | | | |
|---|---|---|---|
| 2012/0260263 A1 | 10/2012 | Edoja | |
| 2015/0169285 A1* | 6/2015 | Reyes | G06F 3/167 |
| | | | 715/728 |
| 2017/0250930 A1 | 8/2017 | Ben-Itzhak | |
| 2018/0218042 A1* | 8/2018 | Krishnan | G06F 16/2455 |
| 2018/0293086 A1 | 10/2018 | Laird-McConnell et al. | |
| 2019/0332647 A1* | 10/2019 | Rincon Opden Bosch | |
| | | | G06F 40/14 |
| 2020/0034399 A1 | 1/2020 | Beno et al. | |
| 2020/0042642 A1 | 2/2020 | Bakis et al. | |
| 2020/0082023 A1 | 3/2020 | Chang et al. | |
| 2021/0279424 A1* | 9/2021 | Galitsky | H04L 51/02 |

OTHER PUBLICATIONS

Microsoft. Nov. 9, 2020. "Get an answer with the GenerateAnswer API". [online] Available at: <https://docs.microsoft.com/en-us/azure/cognitive-services/qnamaker/how-to/metadata-generateanswer-usage#:~:text=By%20default%2C%20QnA%20Maker%20searches,test%20kb%20using%20isTest%3Dtrue%20.> [Accessed Nov. 29, 2021].

Adaptivecards. May 2020. "Samples and Templates | Adaptive Cards". [online] Available at: <https://adaptivecards.io/samples/> [Accessed Nov. 29, 2021].

Adaptivecards. Feb. 14, 2017. Adaptive Cards. [online] Available at: <https://adaptivecards.io/designer/> [Accessed Nov. 29, 2021].

Coppey, Thierry and Carbune, Victor, "Page Navigation For Virtual Assistants Based On A Knowledge Graph", Technical Disclosure Commons, Oct. 25, 2019, Article <https://www.tdcommons.org/cgi/viewcontent.cgi?article=3677&context=dpubs_series> [Accessed Nov. 29, 2021].

Kaasschieter, R., Mar. 5, 2018. "Building a document-based chatbot". [online] Capgemini India. Available at: <https://www.capgemini.com/in-en/2018/03/building-a-document-based-chatbot/> [Accessed Nov. 29, 2021].

Eyskens, S., Mar. 20, 2017. "SharePoint-hosted QnA versus QnA Maker, how do they compare to eachother". [online] Azure DevSecOps. Available at: <https://stephaneeyskens.wordpress.com/2017/03/20/sharepoint-hosted-qna-versus-qna-maker-how-do-they-compare-to-eachother/> [Accessed Nov. 29, 2021].

* cited by examiner

TABLE 1

| Views/Parts | Graphical user interface layer |
|---|---|
| View1, Content | Chat layer |

TABLE 2

| Views/Parts | Graphical user interface layer |
|---|---|
| View1, first part of Content | Chat layer |
| Second part of content | Overlay layer |

TABLE 3

| Views/Parts | Graphical user interface layer |
|---|---|
| First part of content, Second part of content | Chat layer |
| Third part of content | Content layer |
| Fourth part of content | Overlay layer |

FIG. 6

METHODS FOR CONDUCTING A CONVERSATION IN AN APPLICATION ENABLED BY A VIRTUAL ASSISTANT SERVER AND DEVICES THEREOF

FIELD

This technology generally relates to methods, devices, and non-transitory computer readable media for conducting a conversation in an application enabled by a virtual assistant server.

BACKGROUND

In a typical browsing experience, a user types in a URL in an address bar of a browser, reaches a landing page, and tries to identify content in a site map or uses a search bar to identify relevant information. Unfortunately, this browsing experience offered by most websites today does not enable users to easily identify the required content. This difficulty in identifying the content is exacerbated when the user visits the website for the first time. Further, content identification and the time within which the appropriate content is identified is often dependent on the searching expertise of the user and the user interface (UI) or user experience (UX) design of the website.

Lack of intelligent browsing is also one of the drawbacks of the experience offered by websites. For example, the user may navigate to a credit card web page in a banking website, read the content in the web page, and subsequently select "rewards" in the menu bar of the website. Upon selection, the website may mechanically display the entire rewards webpage with multiple types of rewards, where the user may only want to see the credit card rewards. As the entire content related to all rewards is displayed, the user may have to read and parse through this content which is not relevant. Also, the available rewards content presented by the website is the same for every visitor and is not personalized to the user. Additionally by way of example, today's browsing experience of websites are configured to merely provide a reactive form of interaction. Some websites are providing virtual assistants as an interaction option to users, but to date such interactions have had limited functionality and suffer from the same drawbacks discussed above.

Software applications and mobile applications also have similar disadvantages. These applications offer many options stacked in multiple views which are not intuitive and difficult to discover. As a result, applications often rely on "application tours" to accustom the users with the available options and functionality. Such interactions are merely reactive and offer minimal intelligence. To provide intelligent interactions, some mobile banking applications have integrated virtual assistants within the applications. However, again the functionality of such virtual assistants is often limited to conducting basic conversation with the users and also suffer from the drawbacks discussed above.

In particular, with respect to these virtual assistants, to date they are powered by virtual assistant servers to enable users to conversationally find what they are looking for. Additionally, these virtual assistants are configured to maintain contextual information and provide personalized experiences in conversations. However, the capabilities of virtual assistants and virtual assistant servers have been merely limited to orchestrating these basic conversations. Hence, there is a need to provide improved browsing experiences including with virtual assistants beyond these basic conversations.

SUMMARY

An example of a method for generating response by a virtual assistant server includes determining, by the virtual assistant server, at least one user intent based on an analysis of a received textual input. One or more of a plurality of views is identified based on the at least one user intent. Further, the virtual assistant server retrieves content based on the at least one user intent or the identified one or more views. One of a plurality of graphical user interface layers to display for each of one or more parts of the content and the identified one or more views based at least on one or more factors related to the content is determined. Subsequently, the virtual assistant server outputs instructions based on the determined one of the graphical user interface layers in response to the received textual input.

In an example, a virtual assistant server comprises a processor, a memory coupled to a processor which is configured to be capable of executing programmed instructions stored in the memory to determine at least one user intent based on an analysis of a received textual input. One or more of a plurality of views is identified based on the at least one user intent. Further, content based on the at least one user intent or the identified one or more views is retrieved. One of a plurality of graphical user interface layers to display for each of one or more parts of the content and the identified one or more views based at least on one or more factors related to the content is determined. Subsequently, the processor is configured to output instructions based on the determined one of the graphical user interface layers in response to the received textual input.

In an example, a non-transitory computer readable storage medium having stored thereon instructions, for generating a response, which when executed by a processor, causes the processor to determine at least one user intent based on an analysis of a received textual input. One or more of a plurality of views is identified based on the at least one user intent. Further, content based on the at least one user intent or the identified one or more views is retrieved. One of a plurality of graphical user interface layers to display for each of one or more parts of the content and the identified one or more views based at least on one or more factors related to the content is determined. Subsequently, the processor is caused to output instructions based on the determined one of the graphical user interface layers in response to the received textual input.

In an example, a method comprises analyzing, by a virtual assistant server, a conversational user input received via one of a plurality of graphical user interface layers of an application using one or more natural language processing engines to determine at least one user intent. A response to the conversational user input is identified based on the determined at least one user intent. Further, the virtual assistant server determines when at least one other one of the graphical user interface layers is needed to display at least a portion of the identified response based at least on one or more factors related to the response. Subsequently, the virtual assistant server provides instructions to display the generated at least portion of the identified response in the at least one other one of the graphical user interface layers when the determination indicates the need.

BRIEF DESCRIPTION OF THE DRAWINGS

FIG. 6 includes example tables showing one of a plurality of graphical user interface layers to display for each of one or more parts of the content, the identified one or more views.

DETAILED DESCRIPTION

Figure 1:
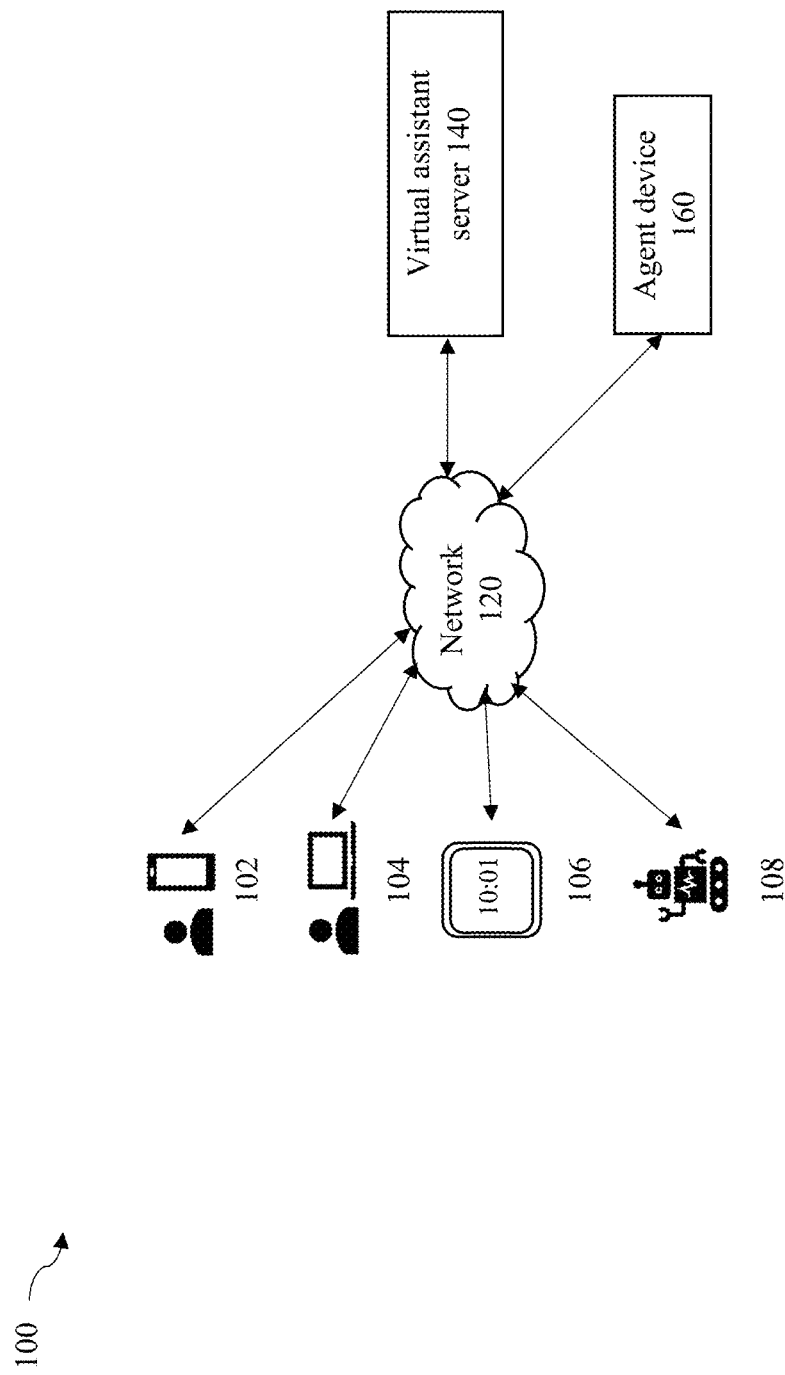
FIG. 1 is a block diagram of an exemplary environment with an example of a virtual assistant server configurable to generate an intelligently targeted response.

An example environment 100 for conducting a conversation in an application enabled by a virtual assistant server (VA server) 140 is illustrated in FIG. 1. The exemplary environment 100 includes examples of input mechanisms including a mobile computing device 102, a personal computing device 104, a wearable device 106, an intelligent device 108, the virtual assistant server 140, and an agent device 160 which are coupled together by a network 120, although the environment 100 can include other types and numbers of devices, components, elements and communication networks in other topologies and deployments. The mobile computing device 102, the personal computing device 104, the wearable device 106, the intelligent device 108, the virtual assistant server 140, and the agent device 160 may communicate using wired technologies such as Local Area Network (LAN), a Wide Area Network (WAN) or wireless technologies such as Wi-Fi, Voice over internet protocol (VoIP), global system for mobile communications (GSM), code division multiple access (CDMA), 3G, 4G, LTE or 5G. While not shown, the exemplary environment 100 may include additional components, such as routers, switches, gateways and other devices which are well known to those of ordinary skill in the art and thus will not be described here. Examples of this technology provide a number of advantages including providing more effective and efficient methods, non-transitory computer readable medium and devices for conducting conversation in the application enabled by a virtual assistant server, such as the VA server 140.

Referring more specifically to FIG. 1, as discussed above, the input mechanism may comprise the mobile computing device 102, the personal computing device 104, the wearable device 106, or the intelligent device 108, which may for example be operated by a user, although other types of input mechanisms may be used. The mobile computing device 102, may be, for example, a mobile telephone, a smartphone, a wearable device, a tablet, a laptop or the like. The personal computing device 104 may be a personal computer or the like. The intelligent device 108, may be, for example, a virtual assistant, a second virtual assistant server with a similar configuration as the VA server 140. A device executing instructions communicated by the second virtual assistant server, or the like. Incoming and outgoing messages from and to one or more of the mobile computing device 102, the personal computing device 104, the wearable device 106, or the intelligent device 108 may traverse the network 120. The mobile computing device 102, the personal computing device 104, the wearable device 106, or the intelligent device 108 may communicate with a virtual assistant which may be part of a website or an application executed by the virtual assistant server 140, although the virtual assistant may be part of other software or hardware executed by other systems or devices in other configurations. When initiating communication with the virtual assistant at the virtual assistant server 140 in this example, the mobile computing device 102, the personal computing device 104, the wearable device 106, or the intelligent device 108 may receive a text, an audio, or a video message such as a welcome message or other prompts.

The network 120 may enable communication between the mobile computing device 102, the personal computing device 104, the wearable device 106, the intelligent device 108, the VA server 140, and the agent device 160 using wired technologies such as Local Area Network (LAN), a Wide Area Network (WAN) or wireless technologies such as Wi-Fi, GSM, CDMA, 3G, 4G, LTE, or 5G.

The VA server 140 may include a back-end server, a computer or a plurality of computers executing a software code that enables communication with the components and other operations in the environment 100 as illustrated and described by way of the examples herein. The VA server 140 may receive a conversational user input such as a textual input, interpret the textual input and map the interpreted textual input to an appropriate user intent, although the VA server 140 may perform other tasks. The user intent may be a purpose or a goal of the user when the user provides the conversational user input. The user intent may be identified based on an analysis of the conversational user input. Below mentioned is an example conversation between a bot, enabled by the VA server 140 in a website, and a user accessing the website.

Bot: Hi, how may I help you today?
User: I would like to fly from LA to NYC.
Bot: When would you like to fly?

The user may provide the textual input—"I would like to fly from LA to NYC." Based on the analysis of the textual input, the VA server 140 may determine that the user intent is "book flight." The VA server 140 may also identify entities in the textual input based on the analysis of the textual input. The entities are the values required to fulfill the user intent. In the above-mentioned example, based on the analysis of the textual input, the VA server 140 may identify the cities as "LA", "NYC" as entities. The VA server 140 may extract entities from the textual input to fulfill the user intent. One or more entities may be designated by a developer as necessary for the VA server 140 to fulfill the user intent. Entities may include one or more of a city, date, date range, time, time zone, country, currency, airport codes, email, phone number, zip code, person name, number, color, address, although other types or numbers of values may be designated as entities in other configurations.

The VA server 140 may include one or more engines to interpret the textual input and map the interpreted textual input to the appropriate user intent using one or more techniques, such as machine learning, semantic rules, knowledge graph, neural networks, deep learning, or artificial intelligence by way of example, although other techniques may be used to interpret the textual input and map the interpreted text to the appropriate user intent. The user at one of the mobile computing device 102, the personal computing device 104, the wearable device 106, or the intelligent device 108 that is communicating with the virtual assistant, which may be part of a website or an application, may instead of the textual input or in addition to the textual input, also provide other forms of input, such as an audio input, a video input, a gesture input, a haptic input, or the like. The VA server 140 may use a third-party service which converts the audio input, video input, gesture input, or haptic input to textual input. The third-party service may output the textual input to the VA server 140 which may interpret the textual input and map the interpreted textual input to the appropriate user intent. In one example, the VA server 140 may convert the audio input, video input, gesture input, or haptic input into textual input.

The agent device 160 may operate autonomously or be operated by a human agent. The agent device 160 may be a mobile phone, desktop, laptop, tablet, wearable device, or the like, although the agent device 160 may include other types of hardware. The agent device 160 may include software which enables the human agent operating the agent device 160 interact with the user. In this example, the software may be rule driven or driven by artificial intelligence. The agent device 160 may communicate with the user, after the VA server 140 connects the user to the agent device 160. The user may also be automatically connected to the agent device 160, for example, upon reaching the URL of a web page, upon selection of an icon in the web page by the user, although the user may be connected to the agent device 160 using other methods. The agent device 160 may provide a response to the user based on one or more parameters output by the VA server 140 to the agent device 160. The agent device 160 may receive inputs including textual input, audio input, video input, gesture input, or the like, although the agent device 160 may receive other types of inputs. The agent device 160 may provide a response to the user based on the received input.

Figure 2:
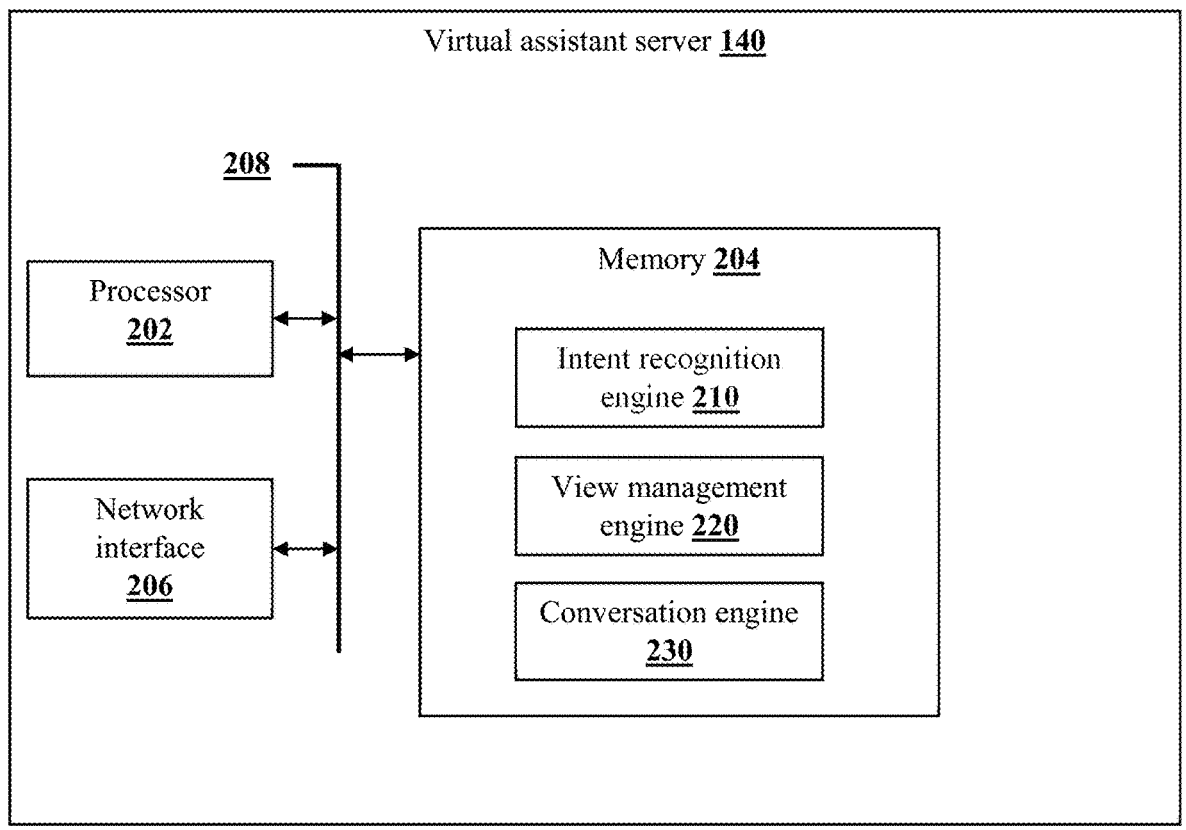
FIG. 2 is a block diagram of an example of components and memory of the example of the virtual assistant server shown in FIG. 1.

Referring more specifically to FIG. 2, an example of the VA server 140 is illustrated. In this example, the VA server 140 may include a processor 202, a memory 204, a network interface 206, and an interconnect bus 208, although the VA server 140 may comprise other types or numbers of other systems, devices, components, or other elements in other configurations.

The processor 202 may execute one or more computer executable instructions stored in the memory 204 for the methods illustrated and described with reference to the examples herein, although the processor can execute other types and numbers of instructions and perform other types and numbers of operations. The processor 202 may comprise one or more central processing units ("CPUs") or general purpose processors with one or more processing cores, such as AMD® processor(s), although other types of processor(s) could be used (e.g., Intel®).

The network interface 206 may provide or enable communication between the VA server 140 and other devices or systems, such as the mobile computing device 102, the personal computing device 104, the software program 106, the hardware device 108, the intelligent device 110, the IVR server 130, the VA IVR server 170, or the agent device 160 by way of example, via the network 120. By way of example only, the network interface 206 may use TCP/IP over Ethernet, UDP, SIP, HTTP, HTTPS, RTP, RTSP, RTCP, SDP, WebRTC, VoIP, or the like and industry-standard protocols, architectural styles, formats including NFS, CIFS, SOAP, REST, VXML, XML, JSON, LDAP, and SNMP although other types and numbers of communication protocols, architectural styles, and formats can be used. The network interface 206 may also enable communication with the VA server 140 across one or more networks such as a wired or a wireless network including the internet.

The memory 204 is an example of a non-transitory computer readable storage medium capable of storing information or instructions. The memory 204 may be a random-access memory, a read only memory (ROM), an erasable programmable read-only memory (EPROM), an electrically erasable programmable read-only memory (EEPROM), a portable optical disk including a CD, a DVD, a hard drive, a magnetic disk, a USB memory card, a memory stick or other electronic, magnetic, optical, electromagnetic, infrared or semiconductor based non-transitory computer-readable storage medium which may be used to tangibly store instructions, which when executed, perform one or more of the disclosed examples. The term computer-readable storage medium does not include signals and carrier waves.

Examples of the programmed instructions and steps stored in the memory 204 are illustrated and described by way of the description and examples herein. In this example, the memory 204 may include an intent recognition engine 210, a view management engine 220, and a conversation engine 230, although other types and numbers of models, modules, or other instructions or data may be stored in the memory 204.

In this example, the intent recognition engine 210 may receive a textual input, interpret the textual input, and map the interpreted textual input to an appropriate user intent. The intent recognition engine 210 may in turn include engines, such as machine learning driven engine, component relationship driven engine, semantic rules driven engine, or a business rules driven engine to perform user intent recognition, although the intent recognition engine 210 may include other types of engines, units, or modules. The intent recognition engine 210 may also use other natural language processing techniques to perform user intent recognition.

Additionally, in this example the view management engine 220 may enable a software application, in this example, the virtual assistant server application (VAS) application, used to create at least parts of the view which may be displayed in the mobile computing device 102, the personal computing device 104, the wearable device 106, or the intelligent device 108. The VAS application may include options to create the view including text, images, buttons, layout, charts, or templates, although the VAS application may include other types, or numbers of options in other configurations. In one example, a text box, an image, a button, a layout selection, a chart, or a template may be selected and added to the view. The options to create the view including the text box, the image, the button, the layout selection, the chart, or the template may have attributes including a name attribute, a description attribute, a design attribute, a layer association attribute, or the like. The developer using the VAS application may add values to the attributes. Further, using the layer association attribute the view management engine 220 may determine a graphical user interface layer of an application in which the view may be displayed. The view management engine 220 may output the software instructions corresponding to the view. The VAS application may also include options to create a bot task, a knowledge graph, the view, a form, a data table, widgets and panels, although the VAS application may include options to create other types, or numbers of tasks, flows, data, or representations in other configurations. The VAS application may also include options to create the view by writing code, adding icons, text, forms, graphs, images, videos, animations, styling elements, positioning elements, templates, although other options to create the view may be enabled by the VAS application. The VAS application may enable associating the created view with a node, a user intent, an utterance, a question, or an answer in the knowledge graph, although the VAS application may enable other types of associations. The VAS application may be a mobile application, or a web application, although the VAS application may be created and rendered in other forms in other configurations.

The VA server 140 may receive a textual input, identify the user intent corresponding to the textual input and output instructions corresponding to the view associated with the intent. The VA server 140 may also retrieve and output content associated with the user intent or the view. In one example, the view management engine 220 may automatically identify the view based on the textual input and output the instructions corresponding to the matched view.

In this example, the conversation engine 230 may enable the VA server 140 to conduct a conversation, although the conversation engine 230 may perform other types of functions in other configurations. The conversation engine 230 may store user context variables, enterprise context variables, bot context variables, or conversational session context variables, although the conversational engine 230 may store other types of variables. The conversation engine 230 may also enable functions such as dialog management, sentiment management, default dialog management, standard response management, or event handlers, although the conversation engine 230 may enable other types of functions.

The intent recognition engine 210, the view management engine 220, or the conversation engine 230 may include software instructions to be executed by the processor 202. In one example, the intent recognition engine 210, the view management engine 220, or the conversation engine 230 may include software instructions, hardware instructions, or a combination of software instructions and hardware instructions.

FIGS. 3A-3F are example wireframes of the VAS application. In this example, the VAS application may be rendered by, for example, a browser executable in the mobile computing device 102, the personal computing device 104, the wearable device 106, or the intelligent device 108, although other software applications or modules may render the VAS application in other examples or configurations. Using the VAS application, the developer may configure how the VA server 140 responds to the conversational user input.

Figure 3A:
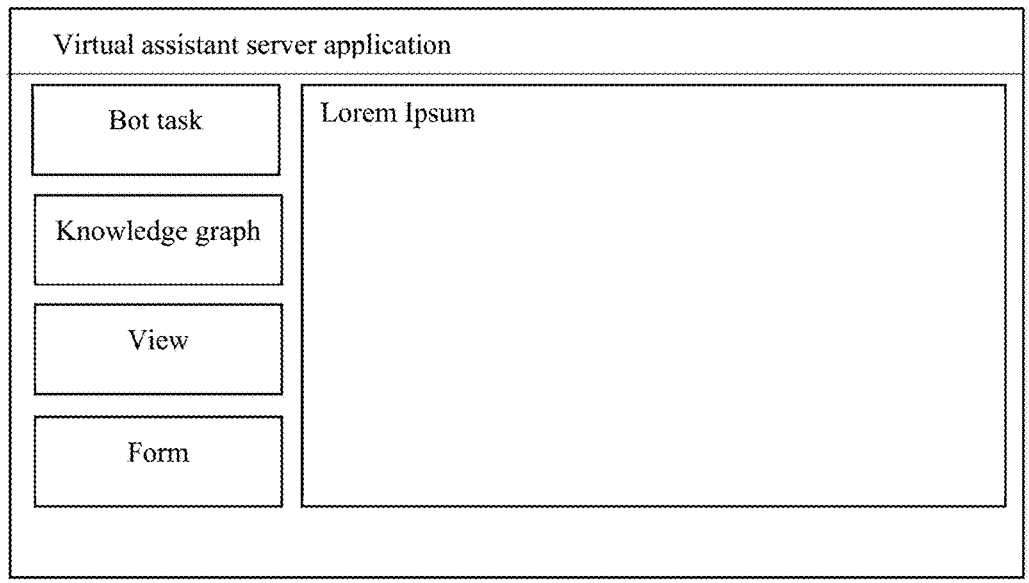
FIGS. 3A-3F are examples of wireframes of a graphical user interface of the virtual assistant server application for configuring the intelligently targeted response of the virtual assistant server shown in FIGS. 1-2.

Referring to FIG. 3A, the VAS application may include options to configure the bot task, the knowledge graph, the view, or the form, although other options may be enabled by the VAS application in other configurations.

Figure 3B:
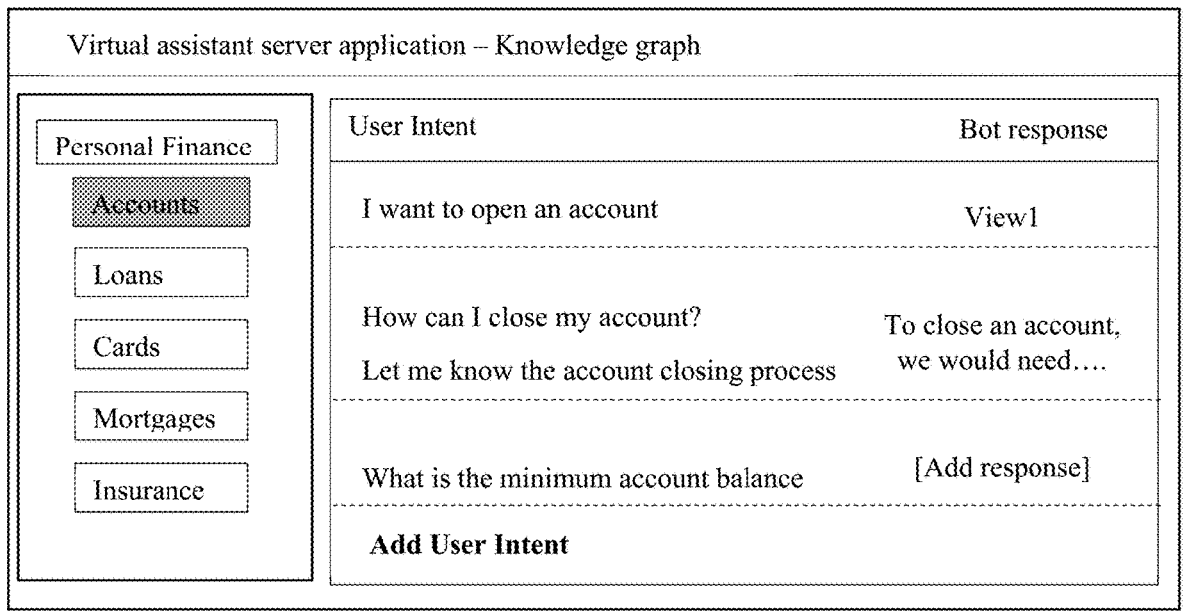

Referring to FIG. 3B, an example of a knowledge graph created using the VAS application is illustrated. The knowledge graph may include parent nodes and child nodes, although the knowledge graph may include other types of nodes or options in other configurations. In this example, the parent node is—personal finance, and the child nodes are: accounts, loans, cards, mortgages, and insurance. One or more user intents and corresponding bot responses may be added to each parent node or the child node. A view may be added as a response to the user intent by selecting the view from templates available in the VAS application or by creating the view using the VAS application. A developer may create or configure the knowledge graph, views, data sources, properties, or other settings in the VAS application, although the developer may add other types of properties, options, or settings in other configurations. In one example, the domain object model (DOM) of a website may be added as the knowledge graph in the VAS application. In another example, an existing website may be scraped and converted into the knowledge graph in the VAS application.

Figure 3C:
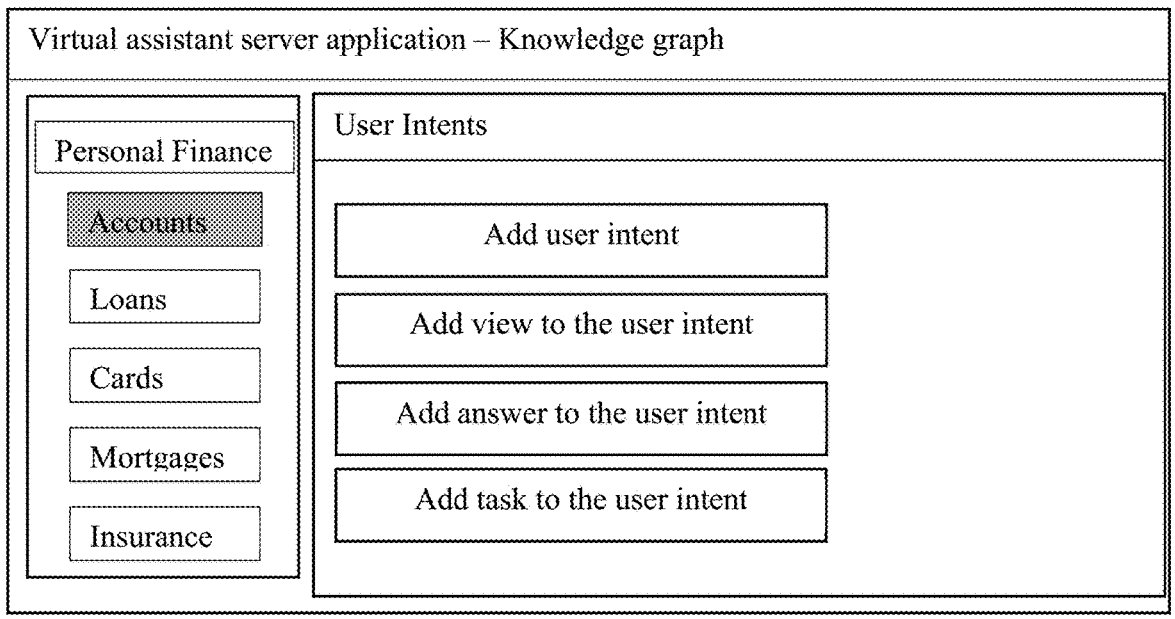

Referring to FIG. 3C, an example wireframe of the VAS application including options to add the user intent and the corresponding bot responses to the user intent is illustrated. In this example, bot responses including a view, an answer, or a task initiation may be added to the intent. The buttons to add the user intent or the corresponding bot responses to the user intent may be displayed by the VAS application upon receiving an indication of selection of "add user intent" or "add response," in FIG. 3B, although other options may be displayed in other configurations. In one example, the buttons to add user intent or the corresponding bot responses to the user intent may be displayed by the VAS application upon receiving an indication of selection of other types of buttons of the VAS application. It may be understood that the content added in the VAS application as the bot response may be the complete bot response which may be displayed in the website or only a part of the bot response. In some examples, the VA server 140 may modify the part of the bot response by adding, deleting, associating content or graphical user interface elements to the part of the bot response.

Figure 3D:
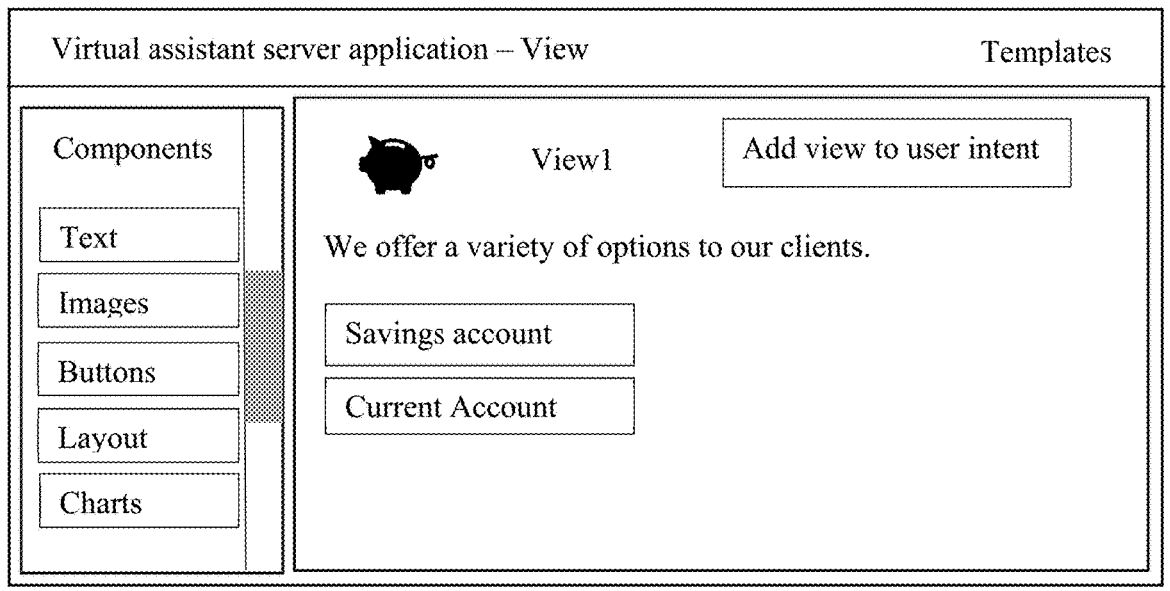

Referring to FIG. 3D, an example wireframe to create a view is illustrated. In this example, the view may be created using a components panel including options to add text, images, buttons, layout, or charts to create the view, although other types of components may be enabled by the VAS application to create the view. Upon selection of a component, the VAS application may display the types of the selected component that are available. In one example, upon selection of charts in the component panel, all the different types of charts available in the VAS application may be displayed. One or more of the charts may be selected and added to the view, for example, by dragging and dropping one or more of the charts into the view. Text, images, or other such components may also be selected and one of the types of the component may be added to the view.

Each view may have a name or a description that the user may fill in using the VAS application. The VA server 140 may semantically compare the conversational user input with the name or description of the view and suggest the view in the instructions which are output.

Figure 3E:
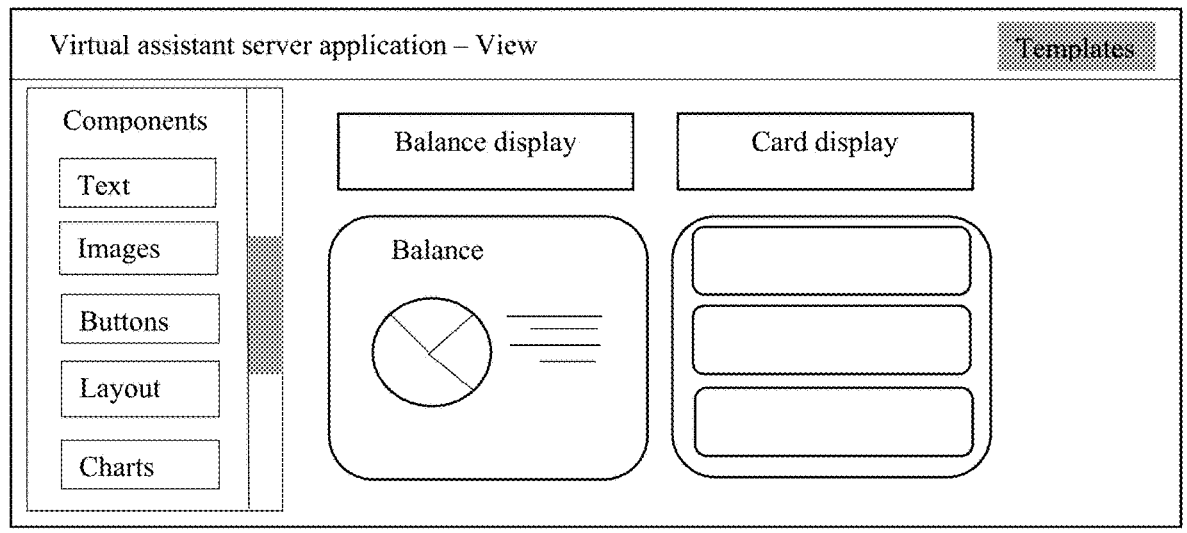

Referring to FIG. 3E, an example wireframe to select a predefined template is illustrated. In this example, the templates may include a balance display, or a card display, although the VAS application may include other types of templates in other configurations. One or more of the templates may be selected as the view or added as a part of the view, for example, by dragging and dropping the template inside the window configured to create the view. In one example, each template may have a card layout and each template may be linked to a data source. In another example the data source may be associated with the user intent. The properties of each template may be configured in the VAS application.

Figure 3F:
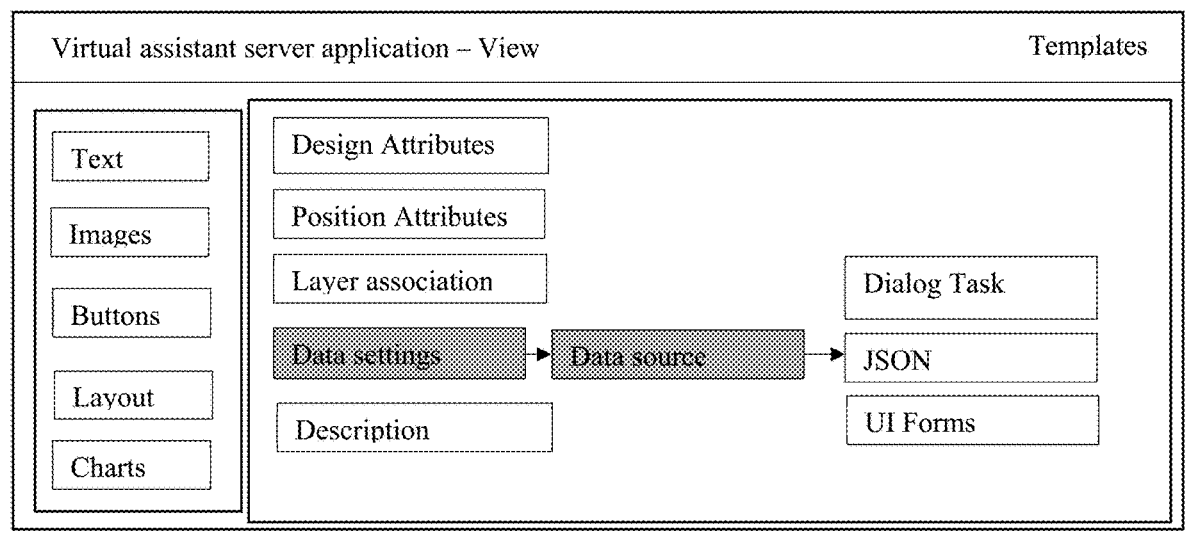

Referring to FIG. 3F, an example wireframe to define properties of a component type, or a template is illustrated. In this example, properties of the type of the component, or the template may include a design attribute, a position attribute, a layer association, data settings, or a description, although the properties may include other options in other configurations. The design attributes may include options such as font size, font type, font color, color, borders, although the design attribute may include other types of options in other configurations. The position attributes may include height, width, alignment, indent, rotate, margin, although the position attribute may include other types of options in other configurations. The layer association property may include the graphical user interface layer suitable to display the component type, although the position attribute may include other types of options in other configurations. The layer association property may include a default graphical user interface layer and a defined graphical user interface layer. The defined graphical user interface layer may be set in the VAS application by the developer or defined by the bot task during runtime. The data settings property may include a data source associated with the component type, although the data settings may include other types of options in other configurations. The data sources may include a source defined in a dialog task, a JSON file, or a form, although the data settings property may include other types of data sources in other configurations. The description property may include a textual description of the component type or the template although the description property may include other options in other configurations.

Figure 4A:
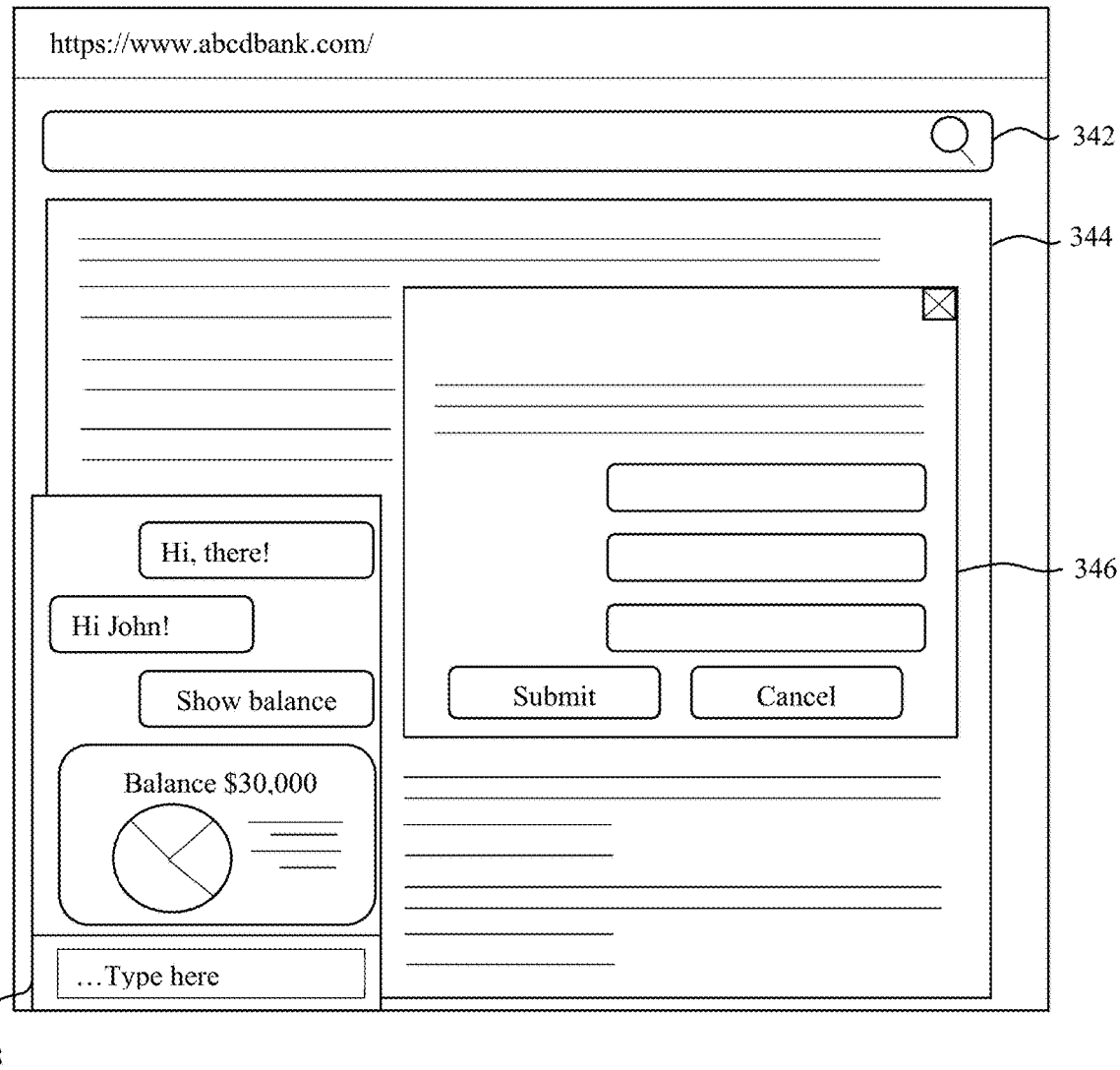
FIG. 4A is an example of another wireframe of a website enabled by the virtual assistant server.

Referring to FIG. 4A, an example wireframe of a website enabled by the VA server 140 is illustrated. The website may include graphical user interface layers including: a search layer 342, a content layer 344, an overlay layer 346, and a chat layer 348, although the website may include other types or numbers of layers in other configurations. Also, for example, the search layer 342, the content layer 344, the overlay layer 346, and the chat layer 348 may be rendered differently than illustrated herein. A user of the website may provide an input in the search layer 342, the content layer 344, the overlay layer 346, and the chat layer 348. The input received may be transmitted to the VA server 140. The VA server 140 may receive the input, process the input, and transmit a corresponding output, for example, in JavaScript Object Notation (JSON) format. The output in the JSON format may include content to be displayed in the website, an identifier of the graphical user interface (GUI) layer to display the content, other identifiers, other type of key value pairs, although the output may include other types of information in other configurations.

The VA server 140 may determine the GUI layer to display the content based on the size of content to be displayed, the type of content to be displayed, number of user intents identified in the textual input, user preferences, website preferences, or previously displayed content, although the GUI layer may be decided based on other factors in other configurations. In one example, the bot task of the VA server 140 may determine the GUI layer. The VA server 140 may also identify multiple GUI layers to display the content. In one example, the VA server 140 may divide the content into parts and identify a GUI layer to display each block. The bot task of the VA server 140 may also determine at runtime the GUI layer to display the content based on user identifier, textual input received, entity identified in the textual input, a match of the textual input with a template property, or the like. In another example, the bot task may be associated with views in the VAS application.

Figure 4B:
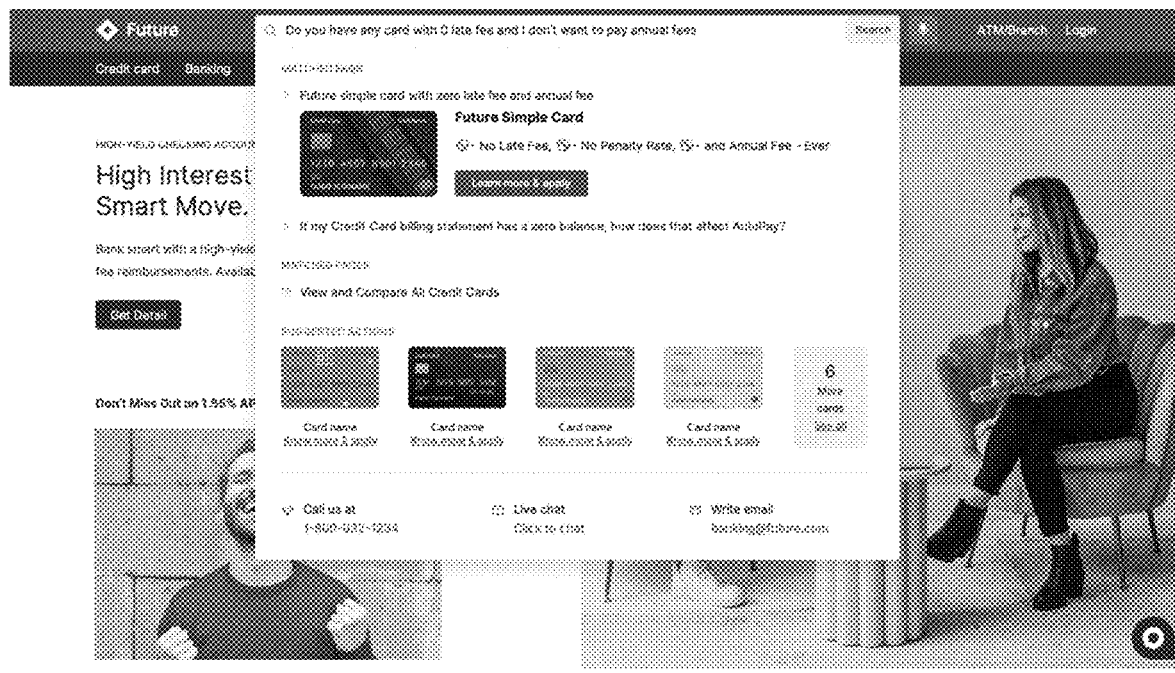
FIG. 4B is an example image of an intelligently targeted website enabled by the virtual assistant server.

Referring to FIG. 4B, an example image of a website enabled by the VA server 140 is illustrated. The website may include the search layer 342 and the content layer 344. In one example, a user of the website may provide the input "Do you have any card with 0 late fee and I don't want to pay annual fees," in the search layer 342. The VA server 140 may receive the textual input, identify the user intent, retrieve the content corresponding to the user intent, determine to display the content in the search layer 342 and output the corresponding instructions. In this example, the instructions may be output to a website software development kit (web SDK) which converts the instructions into HTML and CSS files. The web SDK may output instructions to render the website based on the HTML and CSS files.

In another example, the VA server 140 may not interact with a webSDK. The VA server 140 may create and output the HTML and CSS files. A client browser may receive the HTML and CSS files and render the website. In this example, the VA server 140 may not create the JSON or XML files.

As illustrated, in this example, the content may be rendered in a drop down of the search layer 342. The rendered content in the search layer 342 may include text, images, links, user interface (UI) elements such as buttons. The user may choose to interact with the content rendered in the search layer 342 using mouse clicks, textual, audio, haptic, gesture, or voice-based commands. The subsequently retrieved content after user interaction with the rendered content may also be displayed in the drop down of the search layer 342. Using such a rendering technique, a separate web page may not be rendered to display the retrieved content. Such rendering improves the browsing experience, reduces the time required to display the retrieved content, the power and the memory cycles required to render the website. Rendering actionable content in the drop down of the search layer 342 also enables user interaction the search layer 342, unlike traditional websites which offer a drop down of the search layer 342 merely to provide auto suggestions. It may be understood that rendering content in the drop down of the search layer 342, is merely provided as an example. The retrieved content may also be displayed in other GUI layers of the website.

Figure 4C:
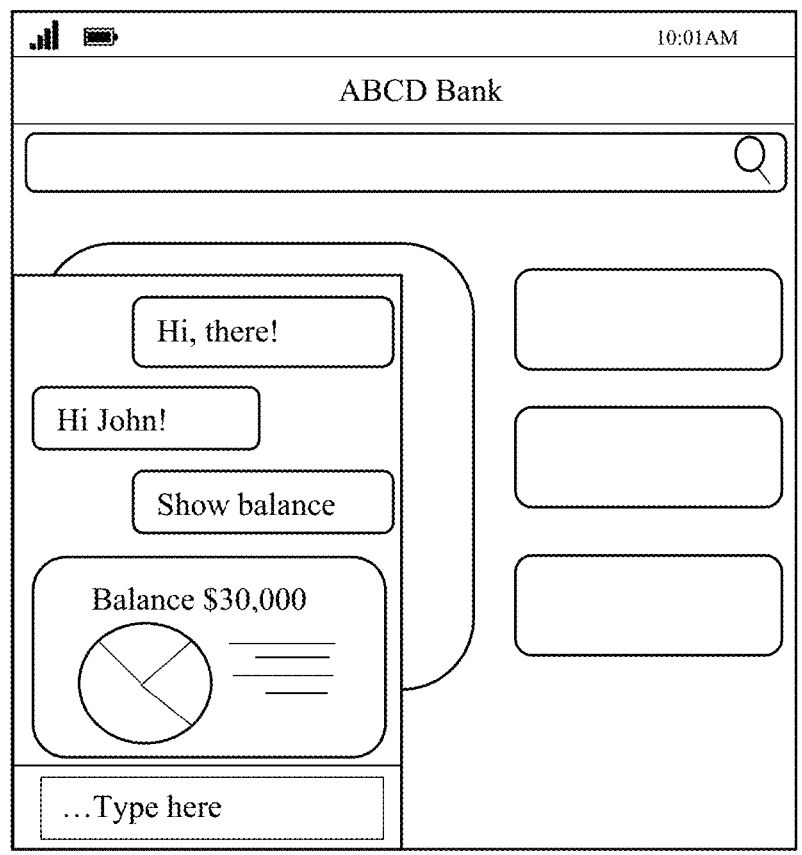
FIG. 4C is an example wireframe of a intelligently configured mobile application enabled by the virtual assistant server.

Referring to FIG. 4C, an example wireframe of a mobile application enabled by the VA server 140 is illustrated. The mobile application may also have the search layer 342, the content layer 344, the overlay layer 346, and the chat layer 348, although the mobile application may include other types or numbers of layers in other configurations. The mobile application may provide same or similar content output and navigation experiences as illustrated in FIG. 4A and FIG. 4B.

Figure 5:
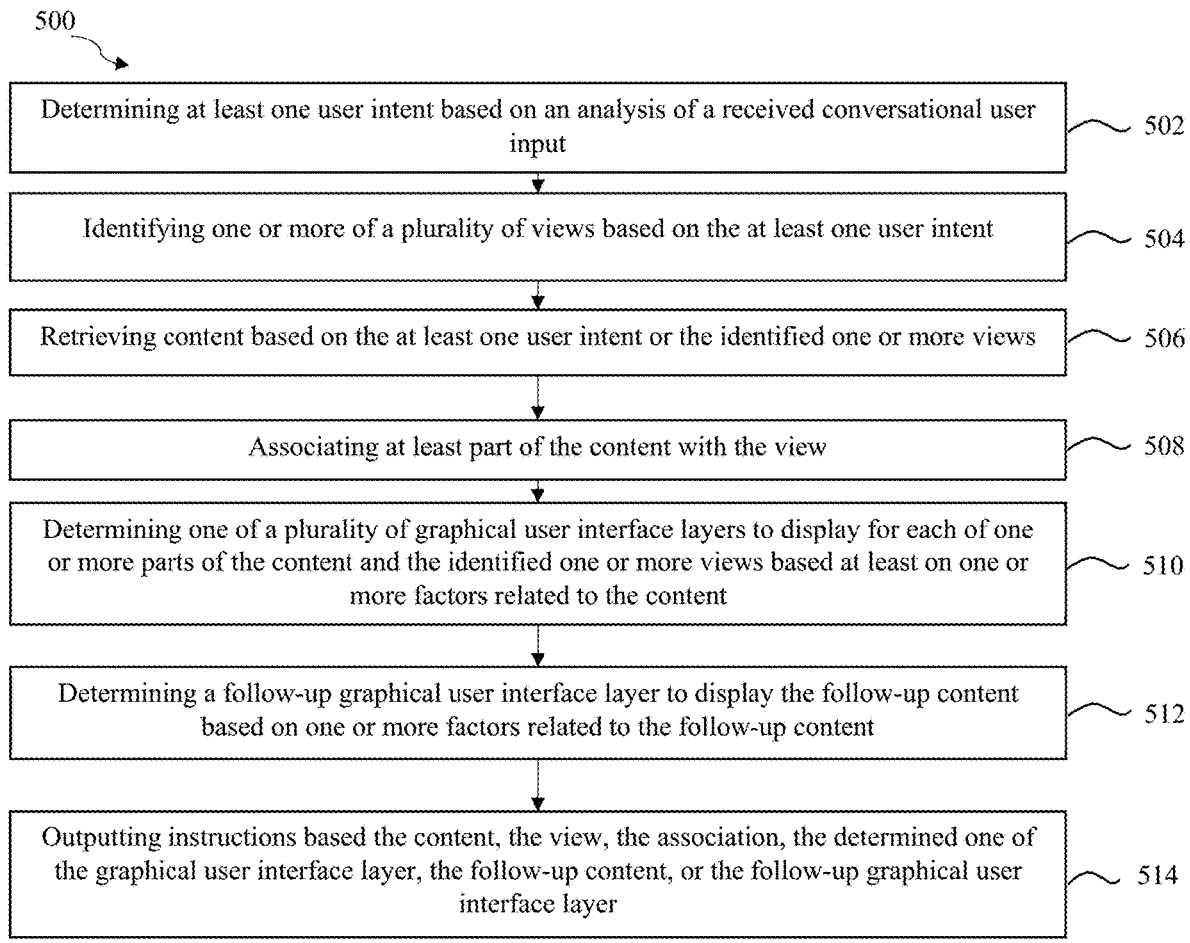
FIG. 5 is a flowchart of an example of a method of the virtual assistant server receiving an input and outputting corresponding instructions.

Referring to FIG. 5, a flowchart of an example of a method of the VA server 140 for receiving a conversational user input and outputting instructions in response to the conversational user input is illustrated. In one example, the method 500 may be performed by a system similar or identical to the system 100 illustrated in FIGS. 1-2.

The exemplary method preferably begins at step 502, at which the VA server 140 may receive a conversational user input and identify a user intent and an entity corresponding to the input, although the VA server 140 may identify other types or numbers of information in other examples. The conversational user input may be a textual input, voice input, gesture input, haptic input, or the like. In one example, the VA server 140 may identify one or more user intents, or one or more entities from the conversational user input. The VA server 140 may use techniques, such as machine learning, natural language processing, pattern recognition, or artificial intelligence based techniques by way of example, to identify the user intent or the entity, although the VA sever 140 may use other types or numbers of techniques in other configurations.

At step 502, the VA server 140 may determine at least one user intent based on analysis of the received conversational user input. In this example, the conversational user input may be the textual input which may be provided by a user in a graphical user interface layer of a website or a mobile application as shown in FIGS. 4A-4C, although the textual input may be provided in other areas in other configurations. The user may also provide a voice input which may be converted into the textual input, for example by the VA server 140 or by a third-party service and used for analysis. In one example, the VA server 140 may receive the textual input "show me the transactions for the last 30 days." From this exemplary textual input, the VA server 140 may identify the user intent as "view transactions" and the entity as "30 days." The VA server 140 may also receive an authentication parameter, a user identifier, or other identification parameters before receiving the textual input or along with the textual input. The VA server 140 may analyze the textual input to identify the user intent using natural language processing engines, such as a machine learning driven engine, a component relationship driven engine, a semantic rules driven engine, or a business rules driven engine, although the user intent may be identified using other types, or numbers of engines or methods in other configurations. These natural language processing engines may use semantic rules, statistical modeling, neural networks, domain ontology, or other such methods to perform the analysis. The VA server 140 may execute a bot task such as a dialog task upon identifying the user intent, although the VA server 140 may execute other types of tasks or functions in other configurations.

At step 504, the VA server 140 may identify one or more of a plurality of views based on the at least one user intent, although the VA server 140 may identify other types of information in other configurations. In one example, the one or more views may be configured as the bot response to the user intent in the knowledge graph of the VAS application as shown in FIG. 3B. The VA server 140 after determining the user intent may identify the view(s) added as the bot response to the determined user intent in the VAS application. In another example, the identification of the view may be performed during the execution of the bot task such as the dialog task. The VA server 140 may identify the properties of the identified view including the design attribute, the position attribute, the data settings, or the layer association. The VA server 140 may add one or more of the identified properties to the output. The VA server 140 may also identify the view using an entity in the textual input, user identifier, user preferences, business rules, presence of a variable or a tag, although the VA server 140 may identify the view using other types of inputs or variables in other configurations. The VA server 140 may determine user preferences based on previous interactions with the user. In one example, the user intent may be associated with multiple views.

At step 506, the VA server 140 retrieves content based on the at least one user intent or the identified one or more views. The content corresponding to the user intent may be static and added to the VAS application, or may be dynamic and may be retrieved from a data source at runtime, although the content corresponding to the user intent may be retrieved using other means or methods in other configurations. The developer may, in the VAS application as shown in FIG. 3F, add a uniform resource locator (URL) of the data source to the user intent, the bot task, or to the view, although the data source may be added to other options in the VAS application in other configurations. Upon determining the user intent or identifying the view, the VA server 140 may retrieve content from the data source associated with the user intent or the view. The information required to access the data source may also be added, for example, to the bot task which may be invoked upon determining the user intent or identifying the view. In one example, the data source may be accessed using an application programming interface (API). The VA server 140 may place a web request to the data source to retrieve content, although the VA server 140 may retrieve content using other means or methods in other configurations. The web request may be a HTTP request such as a GET request or a POST request, although the web request may include other types of requests in other configurations. In one example, the bot task may place the HTTP request along with other parameters required for the HTTP request.

The VA server 140 may pass one or more parameters to the data source in the web request. In one example, the one or more parameters may include user identifier, session identifier, entity value, authentication parameter, although the one or more parameters may include other types of parameters in other configurations.

In this example, the VA server 140 may identify the entity in the textual input "show me the transactions from the last 30 days," as the "last 30 days". The VA server 140 may interpret the entity as the date range of the last 30 days and pass the date range to the data source for content retrieval. The data source may receive the entity value and transmit the transaction information for the date range.

At step 508, the at least part of the retrieved content may be associated with the identified view. An indication of the association may be transmitted by the VA server 140 as part of the instructions in the output which may be, for example, in the JSON format. The association may include specifying the content and the identifier of the view as part of the same object in the output instructions, although the association may be specified using other methods or means in other configurations. The content may be added as a JSON array. An example JSON output including the JSON object and the JSON array is mentioned below.

```
var message = {
    "type": "template",
    "payload":
    {
        "text": "Transactions report chart",
        "template_type": "piechart",
        "pie_type": "regular",
        "elements":
            [{
                "title": "Airlines",
                "value": "1264.0",
                "displayValue" : "$ 1,234"
            },
            {
                "title": "Hotels",
                "value": "568.10",
                "displayValue": "$ 568"
            },
            {
                "title": "Food",
                "value": "324.50",
                "displayValue": "$ 324"
            }],
        speech_hint: "You spent $2855.71 from your account.
        Here is the breakup."
    }
}
print(JSON.stringify(message));
```

In the above-mentioned example, "template_type" which is a piechart may be the identified view and as discussed herein, for example, may not be ideally suited for readable display in, for example, the chat layer 348 and may require a different graphical user interface for better display to the end user. The retrieved content may be the content included in the "elements" array. The view and the retrieved content may be added to the same JSON object in the JSON output to indicate the association. In some examples, the VA server 140 may modify the retrieved content and add the modified content to the JSON object.

By way of example, the VA server 140 may send the JSON output to a website software development kit (web SDK) which creates a hypertext markup language (HTML) file based on the JSON output, although the web SDK may create other types of files in other configurations. In one example, the VA server 140 may also create a cascading style sheet (CSS) file based on the JSON output. The website may be rendered using the HTML and the CSS file.

At step 510, the VA server 140 may determine one of a plurality of graphical user interface (GUI) layers to display for each of one or more parts of the content and the identified one or more views based at least on one or more factors related to the content. By way of example, the VA server 140 may determine that a first part of the content may be displayed in the chat layer 348, a second part of the content may be displayed in the overlay layer 346. The VA server 140 may also determine that the identified view may be displayed in the overlay layer 346. In one example, the VA server 140, after the association in step 508, determine a single graphical user interface layer to display the identified view and the content. The developer may, in the VAS application, configure a preferred or a suitable graphical user interface layer to display each view, or one or more parts of the content, in a layer association property as shown in FIG. 3F. The layer association property may also be automatically determined by the VA server 140 based on the view. The configuration of the layer association property may ensure that each view, when displayed, is clearly visible or readable to the user. In one example, the VA server 140 may determine a graphical user interface layer only for each of one or more parts of the content.

The one or more factors related to the content may include the size of content to be displayed, the type of content to be displayed, number of GUI layers in the website, user preferences, website preferences, or previously displayed content, although the GUI layer may be decided based on other factors in other configurations. In another example, the VA server 140 may determine the graphical user interface layer for the identified view, or one or more parts the content based on their layer association property.

At step 512, the VA server 140 may retrieve follow-up content corresponding to the retrieved content. The VA server 140 may determine a follow-up graphical user interface layer (follow-up GUI layer) to display the at least part of the follow-up content based on one or more factors related to the follow-up content and output instructions based on the determined follow-up graphical user interface layer. In one example, the VA server 140 may retrieve the content and the follow-up content simultaneously.

At step 514, the VA server 140 may output instructions based on the content, the identifier of the view, the association, the determined one of the GUI layer, the follow-up content, the determined follow-up GUI layer so that the response to the textual input may be provided via one or more graphical user interface layers, although the VA server 140 may output instructions based on other types or numbers of information in other configurations. The output instructions may be in the form of JSON, XML, or the like, although the output instructions may be in other formats in other configurations. The output instructions may be received by a server of the target application such as a website and rendered.

For further illustration, in one example, at step 504, in a previous interaction with the VA server 140, the user may have mentioned, in a conversation, to display the transactions as a bar chart. In this example, the VAS application may have the views including a pie chart, a bar chart, and a line chart associated with the intent "view transactions." The VAS application may by default, use pie chart to display the transactions. The VAS application may, during or after the conversation, save the user preference to view the transactions as a bar chart, in the VA server 140. Subsequently, if the VA server 140 identifies an intent match for the user intent—"view transactions" for the same user, then the VA server 140 displays the transactions in the bar chart based on the user preferences.

In one example, at step 508, the retrieved content may include five transactions performed over the last thirty days. Based on the size of content to be displayed, the VA server 140 may determine that the retrieved content may be displayed in the chat layer 348. In another example, when the retrieved content includes one hundred transactions over the last thirty days, the VA server 140 may identify the view which includes only the pie chart and determine that the view may be displayed in the chat layer 348. The VA server 140 may determine that the one hundred transactions may be displayed in the overlay layer 346 or the content layer 344. Further, the VA server 140 may display, for example, a drill down of the pie chart upon receiving a double click on the pie chart.

In another example, at step 502, the VA server 140 may identify multiple user intents in the textual input. In this example, the textual input may be "Show me my balance and the last 30 transactions." The VA server 140 may determine two user intents "show balance" and "display transactions" from this textual input. The VA server 140 may perform the steps 502-512 independently for all the identified user intents. At step 508, in this example, the VA server 140 may determine to display content corresponding to each of the multiple user intents in different GUI layers. The VA server 140 may determine, for example, that the content corresponding to a first user intent of the multiple user intents may be displayed in the chat layer 348, and the content corresponding to a second user intent of the multiple user intents may be displayed in the overlay layer 346. However, at step 512, the VA server 140 may output the instructions based on the multiple user intents together.

In another example, at step 504, the retrieved content may include a video. Based on the type of the content, the VA server 140, at step 508, may determine to display the content in the overlay layer 346. In one example, the user preferences may include displaying graphs in the overlay layer 346. In this example, at step 504, if the retrieved content includes a graph, the VA server 140 based on the user preferences at step 508, may determine to display the content in the overlay layer 346.

In one example, the website preferences may include displaying interactive content including charts, forms, or multimedia content including animations, videos in the overlay layer 346. In one example, the user preferences may include displaying graphs in the overlay layer 346. In this example, at step 504, if the retrieved content includes a graph, the VA server 140 based on the website preferences, at step 508, may determine to display the content in the overlay layer 346.

The previously displayed content may include the view, for example, displayed in one of the GUI layers of the website. A subsequent conversational user input may be a double click or a voice input requesting more information related to the view. The VA server 140 may, at step 508, determine to display the information corresponding to the subsequent conversational user input in a GUI layer based on the previously displayed content. In this example, the VA server 140 output instructions, at step 512, to display a pie chart in the chat layer 348. Subsequently, the VA server 140 may receive the conversational user input requesting information related to the pie chart. Based on the previously displayed content, the VA server 140 may display the information related to the pie chart in the overlay layer 346. For example, the information may be corresponding to a segment of the pie chart.

Referring to FIG. 6, example tables showing the determined one of a plurality of graphical user interface layers for each of one or more parts of the content, the identified one or more views is illustrated. In one example, in TABLE 1, the VA sever 140 determines that the view1 and the content may be displayed in the chat layer 348 of the website. In another example, in TABLE 2, the VA server 140 determines that the view1, first part of the content may be displayed in the chat layer 348 of the website and the second part of the content may be displayed in the overlay layer 346 of the website. In another example, in TABLE 3, the VA server 140 determines that the first part of the content and the second part of the content may be displayed in the chat layer 348, the third part of the content may be displayed in the content layer 344, the fourth part of the content may be displayed in the overlay layer 346. In this example, only content may be configured corresponding to the user intent as part of the bot response in the VAS application.

In one example, the VA server 140 may retrieve the content, determine one or more parts of the content, and output instructions based on the one or more parts of the content and the determined graphical user interface layers. The determination of one or more parts of the content may be based on one or more factors related to the content such as the size of content to be displayed, the type of content to be displayed, number of intents identified in the textual input, user preferences, website preferences, or previously displayed content, although the determination of one or more parts of the content may be decided based on other factors in other configurations.

The VA server 140 may receive the textual input "show me my recent transactions in Starbucks." The VA server 140 may determine the user intent, the entity, identify a geographical map as the view and retrieve the content based on the user intent and the entity. The VA server 140 may determine a first part of the content which may be a summary of transactions and a second part of the content which may be the list of transactions. The VA server 140 may group the second part of the content which include the transactions at Starbucks based on the addresses of the Starbucks outlets in the retrieved content. Subsequently, the VA server 140 may associate the transactions to the view—"geographical map". The VA server 140 may determine that the geographical map along with the associated content may be displayed in the overlay layer 346 and the summary of transactions may be displayed in the chat layer 348, and output instructions accordingly.

In another example, the VA server 140 may retrieve only the content and may not identify the view. In another example, the VA server 140 may modify the retrieved content and output the modified content as part of the output. The VA server 140 may identify one or more parts of the modified content and output instructions based on the one or more factors related to the modified content. The one or more factors related to the modified content may be same as or similar to the one or more factors related to the content.

For further illustration, in one example, the VA server 140 may display the responses to textual inputs from the user in the chat layer 348 of the website. Based on an analysis of a subsequent textual input from the user in the conversation, and identification of the response to the subsequent textual input, the VA server 140 may determine that at least a portion of the identified response to the subsequent textual input must be displayed in the overlay layer 346 of the website, based on one or more factors related to the identified response. Based on the determination that at least a portion of the identified response must be displayed in the overlay layer 346, the VA server 140 may provide instructions to display the at least the portion of the identified response in the overlay layer 346.

Referring back to FIG. 4B, the website may offer different experiences such as a pre-login experience and a post-login experience, for example, in the search layer 342, although the VA server 140 may offer different experiences in other graphical user interface layers. Post-login, the VA server 140 may use the received user credentials to customize the content, although the VA server 140 may use other types of information to customize the content including date, time, month, season, type of device used, or the like. In one example, post-login, the VA server 140 may output instructions to display the content in two graphical user interface layers. In another example, post-login, the VA server 140 may output instructions specifying display of the fonts, colors, or images. In another example, post-login, the VA server 140 may output instructions including personalized content. The VA server 140 may also output instructions with content including personalized offers.

In one example, the VA server 140 may output instructions to display content, for example as shown in FIG. 4B, in the drop down of the search layer 342 including: frequently asked questions (FAQs), bot actions, matched views, animations, videos, user interface elements like carousels, forms, buttons, or the like, although the VA server 140 may output instructions to display other types of information, or user interface elements in other configurations.

The VA server 140 may also understand context, entities, nouns, or other parts of speech, domain language, or the like, from the conversational user input provided in the search layer 342. The search layer 342 powered by the VA server 140 enables integrating all the capabilities of the VA server 140 into the search. This integration enables a seamless navigation and search experience.

Based on the conversational user input, the VA server 140 may output instructions specifying an arrangement of the content in a GUI layer. In one example, the VA server 140 may output instructions to display bot actions at the top of the drop down of the search layer 342. In another example, the VA server 140 may output instructions to display FAQs in a bottom part of the chat layer 348.

In one example, the VA server 140 may receive an imperative sentence: "apply for a credit card," as the conversational user input. The VA server 140 may also receive additional information along with the conversational user input, that the conversational user input was typed in the search layer 342. In this example, as the conversational user input is an imperative sentence, the VA server 140 may output instructions indicating display of the corresponding bot actions in a top part of the drop down of the search layer 342. The VA server 140 may output instructions indicating display of identified FAQs in a bottom part of the drop down of the search layer 342, as the conversational user input is not a question. When the conversational user input is a question, the VA server 140 may, by way of example, output instructions indicating display of identified FAQs in the top part of the drop down of the search layer 342.

In another example, the VA server 140 may receive an interrogative sentence: "how to apply for a credit card," as the conversational user input. The VA server 140 may also receive additional information along with the conversational user input, that the conversational user input was typed in the search layer 342. In this example, the VA server 140 may determine that the conversational user input is an interrogative sentence and as a result the user may be interested to look at an FAQ. Accordingly, the VA server 140 may output instructions specifying display of the identified FAQs, similar to the illustration in FIG. 4B, in a top part of the drop down of the search layer 342. The VA server 140 may output instructions specifying display of the identified bot actions in a bottom part of the drop down of the search layer 342, as the input is not a command.

The content may have position attributes defined in the VAS application, as shown in FIG. 3F. The VA server 140 may, in one example, use the position attributes to determine display position of the content, or the view in the website. In another example, the website enabled by the VA server 140, may support a card layout and each view, or part of content may be a displayed in a card in the card layout.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for generating response by a virtual assistant server comprising:
    determining, by the virtual assistant server, at least: one or more user intents based on an executed analysis of a received conversational user input; and one of a plurality of types of sentences for the received conversational user input, wherein the plurality of types of sentences at least comprise an imperative sentence and an interrogative sentence;
    identifying, by the virtual assistant server, one or more of a plurality of views based on the one or more user intents;
    retrieving content, by the virtual assistant server, based on the one or more user intents;
    dividing, by the virtual assistant server, the retrieved content into a plurality of parts;
    determining, by the virtual assistant server, for the identified one or more of the plurality of views and at least two of the plurality of parts a different one of a plurality of graphical user interface layers based at least on one or more factors related to the retrieved content;
    determining, by the virtual assistant server, an arrangement of at least two of the plurality of parts within at least one of the different ones of the plurality of graphical user interface layers based on the determined one of the plurality of types of sentences for the received conversational user input; and
    outputting, by the virtual assistant server, instructions configured to render a display based on the determined ones of the plurality of graphical user interface layers and the determined arrangement in response to the received conversational user input, wherein the method further comprises associating, by the virtual assistant server, the plurality of parts with the identified one or more of the plurality of views by specifying in the output instructions the plurality of parts and one of a plurality of template properties of the identified one or more of the plurality of views in a JavaScript Object Notation (JSON) object.

2. The method of claim 1, wherein the dividing is based on a number of the one or more user intents determined in the conversational user input.

3. The method of claim 1, wherein the dividing is based on a plurality of data types in the retrieved content.

4. The method of claim 1, wherein the determining the one of the plurality of graphical user interface layers is performed at runtime based on a match of the received conversational user input with one of a plurality of template properties.

5. The method of claim 1, wherein the determining the one of the plurality of graphical user interface layers is based on a layer association property automatically determined based on the one or more of the plurality of views.

6. The method of claim 1, wherein the one or more factors related to the retrieved content comprise: a size of the retrieved content or a data type of the retrieved content.

7. The method of claim 1, wherein the plurality of parts comprise at least: one or more bot actions and one or more frequently asked questions.

8. A virtual assistant server comprising:
    a processor; and
    a memory coupled to the processor which is configured to be capable of executing programmed instructions stored in the memory to:
        determine, at least: one or more user intents based on an executed analysis of a received conversational user input; and one of a plurality of types of sentences for the received conversational user input, wherein the plurality of types of sentences at least comprise an imperative sentence and an interrogative sentence;
        identify one or more of a plurality of views based on the one or more user intents;
        retrieve content based on the one or more user intents;
        divide the retrieved content into a plurality of parts;
        determine for the identified one or more of the plurality of views and at least two of the plurality of parts a different one of a plurality of graphical user interface layers based at least on one or more factors related to the retrieved content;
        determine an arrangement of at least two of the plurality of parts within at least one of the different ones of the plurality of graphical user interface layers based on the determined one of the plurality of types of sentences for the received conversational user input; and
        output instructions configured to render a display based on the determined ones of the plurality of graphical user interface layers and the determined arrangement in response to the received conversational user input, wherein the processor is further configured to be capable of executing the stored programmed instructions to associate the plurality of parts with the identified one or more of the plurality of views by specifying in the output instructions the plurality of parts and one of a plurality of template properties of the identified one or more of the plurality of views in a JavaScript Object Notation (JSON) object.

9. The virtual assistant server of claim 8, wherein the divide retrieved content is based on a number of the one or more user intents determined in the conversational user input.

10. The virtual assistant server of claim 8, wherein the divide retrieved content is based on a plurality of data types in the retrieved content.

11. The virtual assistant server of claim 8, wherein the determine the one of the plurality of graphical user interface layers is performed at runtime based on a match of the received conversational user input with one of a plurality of template properties.

12. The virtual assistant server of claim 8, wherein the determine the one of the plurality of graphical user interface layers is based on a layer association property automatically determined based on the one or more of the plurality of views.

13. The virtual assistant server of claim 8, wherein the one or more factors related to the retrieved content comprise: a size of the retrieved content or a data type of the retrieved content.

14. The virtual assistant server of claim 8, wherein the plurality of parts comprise at least: one or more bot actions and one or more frequently asked questions.

15. A non-transitory computer-readable medium having stored thereon instructions for generating a response which when executed by a processor, causes the processor to:
determine, at least: one or more user intents based on an executed analysis of a received conversational user input; and one of a plurality of types of sentences for the received conversational user input, wherein the plurality of types of sentences at least comprise an imperative sentence and an interrogative sentence;
identify one or more of a plurality of views based on the one or more user intents;
retrieve content based on the one or more user intents;
divide the retrieved content into a plurality of parts;
determine for the identified one or more of the plurality of views and at least two of the plurality of parts a different one of a plurality of graphical user interface layers based at least on one or more factors related to the retrieved content;
determine an arrangement of at least two of the plurality of parts within at least one of the different ones of the plurality of graphical user interface layers based on the determined one of the plurality of types of sentences for the received conversational user input; and
output instructions configured to render a display based on the determined ones of the plurality of graphical user interface layers and the determined arrangement in response to the received conversational user input, wherein the instructions when executed by the processor further causes the one or more processors to associate the plurality of parts with the identified one or more of the plurality of views by specifying in the output instructions the plurality of parts and one of a plurality of template properties of the identified one or more of the plurality of views in a JavaScript Object Notation (JSON) object.

16. The non-transitory computer-readable medium of claim 15, wherein the divide the retrieved content is based on a number of the one or more user intents determined in the conversational user input.

17. The non-transitory computer-readable medium of claim 15, wherein the divide the retrieved content is based on a plurality of data types in the retrieved content.

18. The non-transitory computer-readable medium of claim 15, wherein the determine the one of the plurality of graphical user interface layers is performed at runtime based on a match of the received conversational user input with one of a plurality of template properties.

19. The non-transitory computer-readable medium of claim 15, wherein the determine the one of the plurality of graphical user interface layers is based on a layer association property automatically determined based on the one or more of the plurality of views.

20. The non-transitory computer-readable medium of claim 15, wherein the one or more factors related to the retrieved content comprise: a size of the retrieved content or a data type of the retrieved content.

21. The non-transitory computer-readable medium of claim 15, wherein the plurality of parts comprise at least: one or more bot actions and one or more frequently asked questions.

* * * * *